United States Patent
Hellman et al.

[19]

[11] Patent Number: 6,064,648
[45] Date of Patent: *May 16, 2000

[54] METHOD FOR NOTIFYING A FRAME RELAY NETWORK OF TRAFFIC CONGESTION IN AN ATM NETWORK

[75] Inventors: Esko Hellman, Espoo; Hannu Flinck, Helsinki, both of Finland

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/875,582

[22] PCT Filed: Dec. 21, 1995

[86] PCT No.: PCT/FI95/00705

§ 371 Date: Jun. 18, 1997

§ 102(e) Date: Jun. 18, 1997

[87] PCT Pub. No.: WO96/19886

PCT Pub. Date: Jun. 27, 1996

[30] Foreign Application Priority Data

Dec. 21, 1994 [FI] Finland ..................................... 946011

[51] Int. Cl.[7] .................................................. G01R 31/08
[52] U.S. Cl. ........................... 370/230; 370/401; 370/410
[58] Field of Search ..................................... 370/229, 230, 370/231, 232, 235, 236, 237, 238, 239, 400, 401, 410

[56] References Cited

U.S. PATENT DOCUMENTS

| | | | |
|---|---|---|---|
| 5,457,687 | 10/1995 | Newman | 370/232 |
| 5,490,141 | 2/1996 | Lai et al. | 370/352 |
| 5,506,839 | 4/1996 | Hatta | 370/236 |
| 5,694,390 | 12/1997 | Yamato et al. | 370/230 |
| 5,734,654 | 3/1998 | Shirai et al. | 370/396 |

FOREIGN PATENT DOCUMENTS

| | | |
|---|---|---|
| 487 235 | 5/1992 | European Pat. Off. . |
| 593 843 | 4/1994 | European Pat. Off. . |

OTHER PUBLICATIONS

CCITT Recommendation I..233.1, pp. 2–37.
CCITT Recommendation Q.922, 1989–1992, pp. 1–118.
"An Overview of Frame Relay Technology", Datapro Management of Data Communications, McGraw–Hill Corporated, Apr. 1991, pp. 101–107.
"Frame Relaying Bearer Service Interworking", ITU–T Draft Recommendation I.555, Nov. 1993, pp. 1–21.
B–ICI Specification, Version 1.0, Jun. 1993, pp. 107–119.
"Traffic Control and Congestion Control in B–ISDN", ITU–T Recommendation I.371, Item 7.1 Mar. 1993, pp. 1–26.
IFIP TC6 Task Force/WG6.4 International Conference on Data communication systemsandtheir "Performance of Frame Relay Services on ATM Networks" pp. 273–297.
CSELT Technical Reports, vol. XXII, No. 3, Jun. 1994, P. Castelli, "Frame Relay over ATM: Traffic Control Aspects", pp. 307–326.
International Telecommunication Union, CCITT Digital Subscriber Signalling System No. 1 (DSS1), Data Link Lyer Recommendations Q.920–Q.921, 9th Plenary Assembly, Melborune, Nov. 14–25, 1998, including a correction to Table 9/Q.921.

*Primary Examiner*—Ajit Patel
*Assistant Examiner*—Bob A. Phunkulh
*Attorney, Agent, or Firm*—Pillsbury Madison & Sutro, LLP

[57] ABSTRACT

A method for notifying a frame relay network of traffic congestion in an ATM network. When the ATM network provides a notification of congestion, a management message, which is independent from a user-traffic carrying message, is generated at an interface between the ATM network and the frame relay network and transmitted to the frame relay network sending user traffic to the ATM network.

6 Claims, 3 Drawing Sheets

METHOD FOR NOTIFYING A FRAME RELAY NETWORK OF TRAFFIC CONGESTION IN AN ATM NETWORK

BACKGROUND OF THE INVENTION

1. Field of the Invention

The present invention relates to a method for notifying an FR network of traffic congestion in an ATM network.

2. Description of Related Art

ATM (Asynchronous Transfer Mode) is a new connection-oriented packet-switching technique which the international telecommunication standardization organization ITU-T has chosen to be the target solution of a broadband integrated services digital network (B-ISDN). The problems of conventional packet networks have been eliminated in the ATM network by using short packets of a standard length (53 bytes) known as cells.

FIG. 1a shows the basic structure of one cell to be transmitted in an ATM network. Each cell transmitted in the network contains a payload section of 48 bytes and a header of 5 bytes in length, but the more detailed structure of the header (the contents of the header) depends on which part of the ATM network is being used at the time. The ATM network architecture comprises a group of interfaces accurately specified in the standards, and the header structure used in an ATM cell depends on the interface (i.e. the part of the network) in question.

FIG. 1b shows the structure of the cell header at a UNI interface (User-to-Network Interface) of the ATM network, which is the interface between an ATM terminal equipment (such as a computer, a router or a telephone exchange) and an ATM node. FIG. 1c shows the structure of the header at an NNI interface (Network-to-Network Interface) of the ATM network, which is the interface between two ATM nodes, either inside the network or between two different networks.

The routing field of the cell header consists of the Virtual Path Identifier VPI and the Virtual Channel Identifier VCI. In the header structure of FIG. 1b, which is used only at a subscriber interface, 24 bits in all are reserved for the routing field (VPI/VCI). In the header structure of FIG. 1c, which is used everywhere else in the ATM network, 28 bits are reserved for the routing field (VPI/VCI). As the name suggests, the routing field serves as the basis for the routing of cells in the ATM network. The inner parts of the network primarily use the virtual path identifier VPI, which in practice often determines to which physical connection a cell is to be routed. On the other hand, the virtual channel identifier VCI is often used for routing only at the boundary of the network, for example when connecting FR connections (FR=Frame Relay) to the ATM network. However, it is to be noted that only VPI and VCI together define the route of the cell unambiguously.

The other fields in the header of an ATM cell as defined by the specifications are GFC (Generic Flow Control): a field intended for traffic control at a subscriber interface, not yet accurately defined, PTI (Payload Type Indicator): primarily used for distinguishing between the management cells of the network and the information cells of the subscribers, but it is also possible to distinguish information cells of the subscribers on the basis of whether or not congestion has been detected on the way, CLP (Cell Loss Priority): used for prioritizing cells in relation to the discard probability (closely corresponds to the DE bit of the Frame Relay network), HEC (Header Error Control): the check sum of the header.

Of these other fields, the present invention is solely concerned with the PTI field, which can be used for transmitting congestion notifications specific for a virtual path or a virtual channel.

The Frame Relay (FR) technique is a packet-switched network technique used for the transmission of frames of varying length in place of the packet-switched network connections presently in use. The protocol (X.25) applied generally in the present packet-switched networks requires plenty of processing and the transmission equipment is expensive, as a result of which the speeds also remain low. These matters are due to the fact that the X.25 standard was developed when the transmission connections used were still rather prone to transmission errors. The starting point of the frame relay technique was a considerably lower transmission line error probability. It has therefore been possible to discard a number of unnecessary functions in the frame relay technique, which makes the delivery of frames rapid and efficient. The Frame Mode Bearer Service is described generally in ITU-T (former CCITT) Recommendation I.233 and the associated protocol in Recommendation Q.922. For a more detailed description of the FR technique, reference is made to An Overview of Frame Relay Technology, Datapro Management of Data Communications, McGraw-Hill Incorporated, April 1991, as well as the above-mentioned recommendations.

As stated above, data is transmitted in an FR network in packets of varying length, so-called frames. In FR networks, congestion is indicated by a so-called FECN or BECN (Forward or Backward Explicit Congestion Notification) bit of a frame. FIG. 2 shows a typical FR network frame format 21 where the address field preceding the information field comprises two octets (bits 1 to 8). Bits 3 to 8 of the first octet and bits 5 to 8 of the second octet form a Data Link Connection Identifier DLCI, which indicates to the node for example the virtual connection and virtual channel to which a particular frame belongs. The virtual channels are distinguished from each other by means of the data link connection identifier. The data link connection identifier, however, is unambiguous only over a single virtual channel, and it may change in the node on transition to the next virtual channel. Bits 3 and 4 of the second octet are the above-mentioned FECN and BECN bits. As the other bits in the FR frame are not relevant to the present invention, they will not be described more closely herein. An interested reader will find a more detailed description for instance in the references mentioned above.

Interconnection of ATM- and FR-type networks has been dealt with, for example, in ITU Draft Recommendation I.555 and B-ICI Specification, Version 1.0, June 1993. In order to deal with congestion at an interface between networks, it has been suggested that the PTI bit (which is the middle bit of the three-bit PTI field) from the ATM network be picked from the last cell of a segmented frame and encoded into the FECN bit of the FR network, whereby information of congestion is transferred from the ATM network to the FR network (B-ICI 1.0, p. 116).

The drawback of this procedure is that the FECN and BECN bits are part of an FR frame of normal traffic, wherefore the delivery of a congestion notification may be delayed or even completely fail. The cell carrying a congestion notification in the ATM network may also be caught in congestion, and thus the propagation of the congestion notification may be delayed. FR traffic has been managed using a procedure according to which, having received a FECN bit as an indication of congestion, a terminal equipment transmits information to the other end, using a BECN bit. In order that this bit might be transmitted, there must however be subscriber traffic in this direction. This drawback will be illustrated more closely below in connection with FIG. 4.

SUMMARY OF THE INVENTION

The object of the present invention is to provide such a method for notifying an FR network of congestion in an ATM network that is more rapid and reliable than the methods suggested so far. The method of the invention is characterized in that when the ATM network provides a notification of congestion, a management message (CLLM, Consolidated Link Layer Management Message) is generated at the interface between the ATM network and the FR network and transmitted to the FR network sending congested traffic.

The invention is based on the realization that the management messages (CLLM) of an FR network can be transmitted and received independently of the other traffic of the FR network. Since the management messages (CLLM) can be used for congestion notifications within the FR network, they can, according to the invention, also be utilized for transferring congestion notifications from outside the FR network.

The various embodiments of the method of the invention are characterized by what is disclosed in the appended claims.

BRIEF DESCRIPTION OF THE DRAWINGS

In the following, the invention and its preferred embodiments will be described in greater detail by means of an example and with reference to the accompanying drawings, in which.

DETAILED DESCRIPTION OF THE PREFERRED EMBODIMENTS

Figure 3:
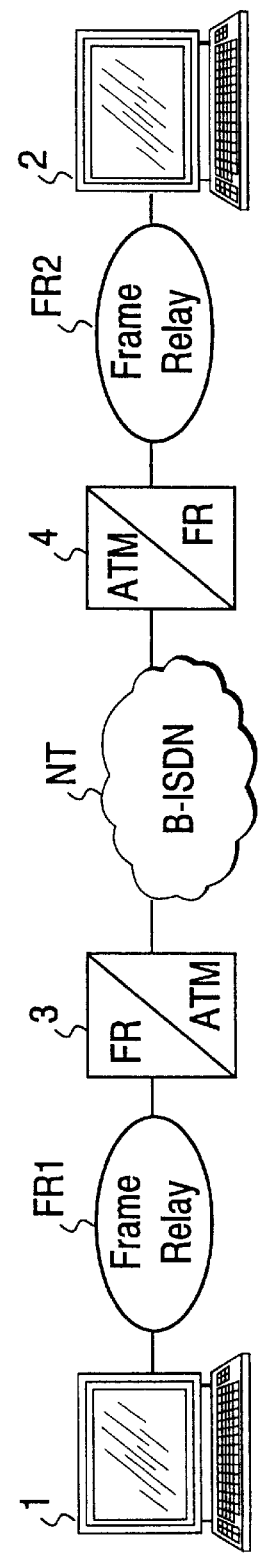
FIG. 3 illustrates interconnected ATM and FR networks.

FIG. 3 is a schematic view of two FR networks FR1 and FR2 connected by a high-speed B-ISDN network NT implemented with ATM technology. Each of the terminals 1 and 2 of the end-users is connected to its own FR network, and the FR networks are connected to the B-ISDN network through IWF interfaces 3 and 4 (InterWorking Function). At the IWF interfaces 3 and 4, measures are taken at several different levels for multiplexing traffic routed through the ATM network: e.g. multiplexing/demultiplexing of frames, management of priority and overload situations (B-ISDN Class C functions), determination of the FR frame size, their formation, and indication of transmission errors (B-ISDN Message Mode).

Figures 1A, 1B, 1C:
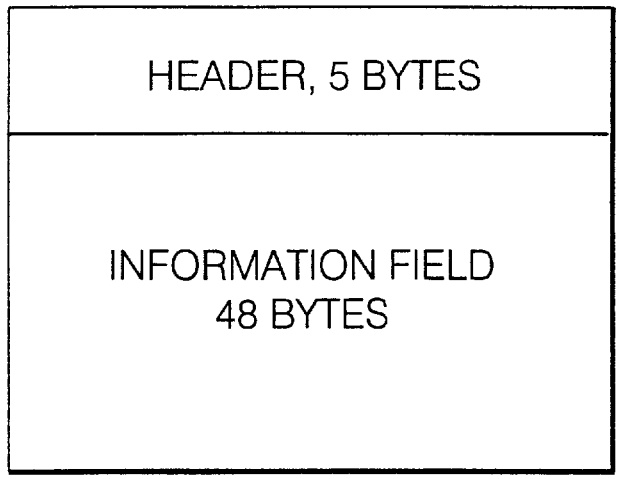
FIGS. 1a to 1c illustrate the general format of an ATM cell.
Figure 2:
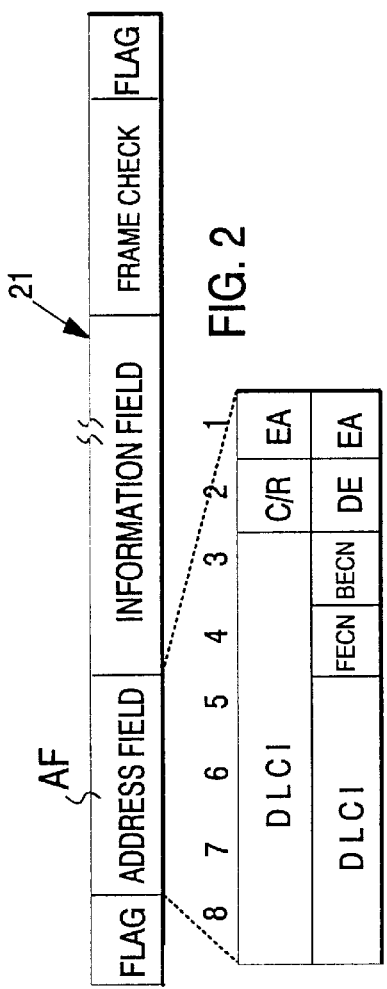
FIG. 2 illustrates the frame format in an FR network.

According to the method of the invention, a notification of traffic congestion occurring in an ATM network, indicated e.g. by the bits of the PTI field of an ATM cell, can be provided to an FR network by generating a management message CLLM at the IWF interface 3 or 4 between the ATM and FR networks, and transmitting the message to the FR network FR1 or FR2. As can be seen from FIGS. 1b and 1c, the PTI field comprises three bits, and thus it can have, altogether eight different values. However, only some of these values correspond to the user's cells (some of the eight values of the PTI field belong to OAM cells, which cannot be used for indicating congestion). In practice, it is thus the value of the middle bit of the PTI field that indicates whether congestion has been detected. A congestion notification is thus received by means of the middle bit of the PTI field.

Figure 5:
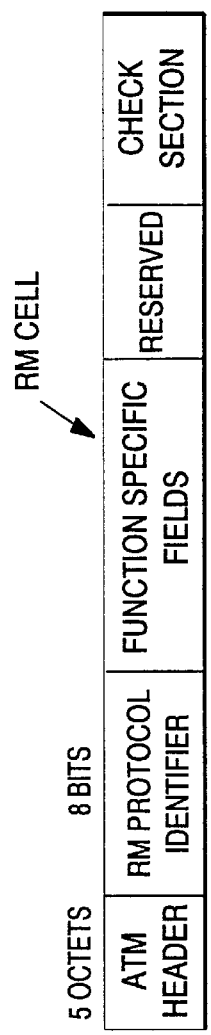
FIG. 5 illustrates the format of an RM cell in an ATM network.
Figure 4:
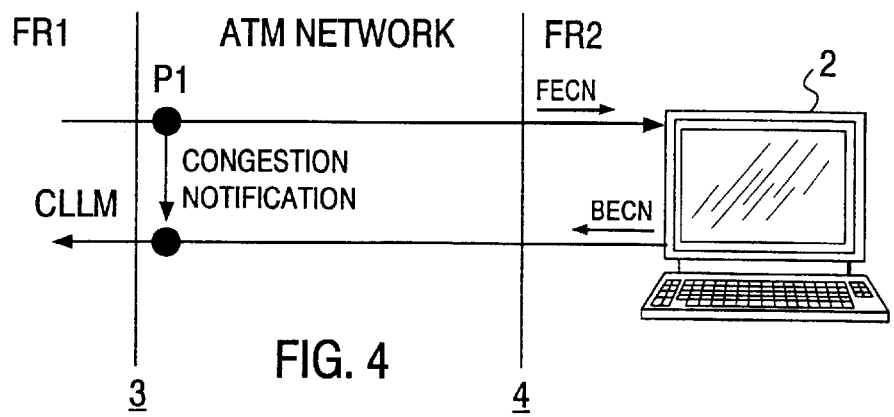
FIG. 4 illustrates a transmission mechanism according to the invention for transmitting a CLLM message.

FIG. 4 illustrates the transmission mechanism according to the invention for transmitting a CLLM message. If the traffic from the FR network FR1 towards the ATM network in FIG. 3 (and further to the terminal equipment 2 of the FR network FR2) is congested at point P1 in the ATM network, and the above-mentioned PTI bit is therefore set to indicate congestion, a CLLM message is generated at the interface between the networks in response to the congestion notification to be transmitted in the backward direction so that the network (FR1) causing the congestion knows that the amount of traffic must be reduced. If the point P1 is located deeper in the ATM network than at the interface between the networks, a congestion notification can be transmitted to the interface 3 for example in the RM (Resource Management) cells of the ATM network, and as a result of this, a CLLM message can be generated and transmitted to the network causing the congestion. FIG. 5 illustrates the format of an RM cell, which is also described in ITU-T Recommendation I.371, Item 7.1. A congestion notification can be encoded, for example, into the section "Function specific fields" of 45 octets or into the following "reserved" section of 6 octets.

If the above-mentioned PTI bit is set in the last cell of traffic to an FR network, the PTI bit is automatically mapped into a FECN bit according to the above-mentioned Recommendation I.555, whereas the BECN bit of FR traffic remains unchanged when transferred through the interface. The essential feature of the invention is to use the management message (CLLM) for congestion notification, which is particularly advantageous when there is little or no traffic towards the FR network causing the congestion.

It can be easily perceived from FIG. 4 that the use of a CLLM message according to the invention essentially shortens the time it takes to deliver the congestion notification to the network sending the traffic, whereby the network can reduce the amount of traffic transmitted. If the CLLM message were not used, the cell indicating the congestion might be unnecessarily delayed, for instance, in a buffer of the ATM network (e.g. at the congested point P1 in FIG. 4). When the congestion notification has been converted at the interface 4 into a congestion notification indicated by the FECN bit, and when it has reached the equipment 2 receiving the traffic, the equipment may have nothing to transmit; the generation of the BECN bit on the basis of the FECN bit received may therefore be delayed or completely fail, and thus the congestion notification received by the FR network FR1 may be delayed or its delivery may fail completely.

Figure 6:
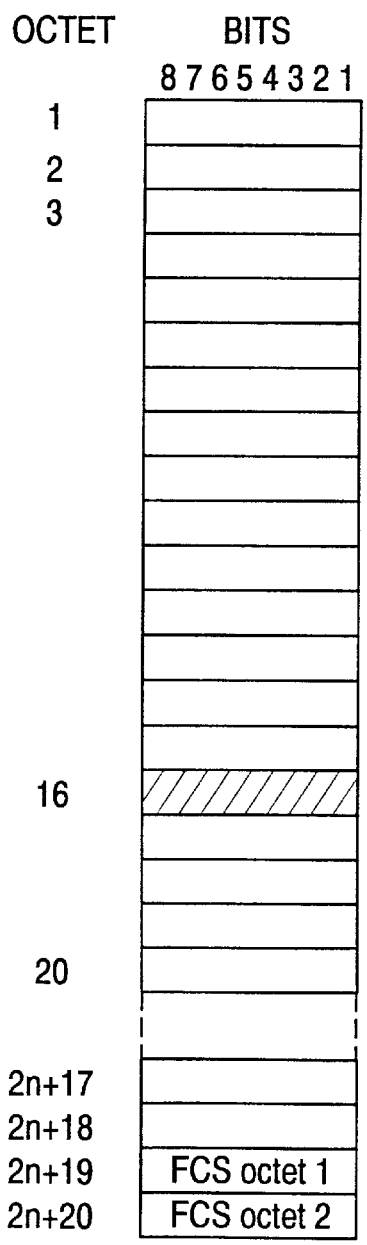
FIG. 6 illustrates a frame which includes a CLLM message and which is to be transferred in an FR network.

In an FR network, the CLLM message is an optional message which indicates the operating state of the network and which is transmitted independently of the other traffic in a separate XID response frame (XID=Exchange Identification) specified in CCITT Recommendation Q.921 on a management channel. Such a frame, the general format of which is illustrated in FIG. 6, contains 2n+20 octets, where n is determined by a parameter included in the frame. According to ITU-T Recommendation Q.922, Committee Report COM XI-R 63-E, the reason behind the message is defined in octet 16, shown by hatching in FIG. 6. By means of the bits of this octet it is possible to identify e.g. short-term or long-term congestion caused by overload, faults in equipment, service operations, etc. Theoretically, it is thus possible to indicate several different reasons for congestion to an FR network, but this requires that the corresponding distinction be made in the congestion notification of the ATM network.

The two last octets of the frame, including the CLLM message, are the FCS octets 1 and 2 (Frame Check Sequence). These octets are preceded in the CLLM message by a list of DLCI values, which identify the logical links on which congestion has been detected. When the CLLM message is generated in accordance with the invention, this list comprises the identifiers of those virtual connections to the ATM network from which a congestion notification has been received.

The DLCI value, i.e. the channel of the FR link, is typically found by means of tables. If a cell indicates congestion, the DLCI value obtained is stored in a CLLM message. In practice, the most preferred embodiment (because of its rapidity) may be a method in which a CLLM message is transmitted immediately when a congestion notification is received from a connection (after a congestion-free period of time). In this case, the CLLM message contains the DLCI value of only one connection. However, if too many messages containing only one DLCI value are transmitted, it is more advantageous to collect several DLCI values and transmit them in one message.

If congestion information is continuously received from the same ATM channel, it is not necessary to transmit a CLLM message on the basis of all the cells containing this information. For this purpose, the interface may be provided with a filter facility, according to which the congestion notification of one cell is not sufficient to launch the transmission of a CLLM message (since the following cells no longer necessarily indicate congestion). A CLLM message will thus not be sent until a certain number of successive cells which all indicate congestion have been received from the connection, or until a certain number of cells indicating congestion have been received, for example, within a certain time. Such a filter facility can be implemented very simply by means of counters and possibly a timer.

In a connection with filtering, it is also possible to count those cells which indicate that no congestion has been detected. When a certain number of "congestion-free" cells, possibly successive "congestion-free" cells, have been received, a specific "congestion over" message can be transmitted towards the FR network. However, this is not a very significant feature in practice, since the receiver of CLLM messages can in any case, on the basis of time supervision, determine that the channel is in order (congestion-free), since otherwise congestion notifications would be received at certain intervals.

A CLLM frame is generated in accordance with I.555 at the sublayer FR-SSCS (Frame Relaying Service Specific Convergence Sublayer) of the interface 3 or 4 between the ATM and FR networks. The internal architecture of an interface is disclosed in the above-mentioned specification B-ICI, in which an interested reader will find a more detailed description.

It will be obvious to one skilled in the art that the various embodiments of the invention are not limited to the example described above but can be modified within the scope of the appended claims. Although it has been stated above that a congestion notification is always transmitted in a cell, it is in principle also possible to transfer a congestion notification to an interface utilizing the internal data transmission of, for example, a node equipment or a network.

What is claimed is:

1. A method for indicating traffic congestion from an ATM network to a frame relay network, the method comprising:

transmitting, in the frame relay network, messages of at least a first type and a second type, the messages of the first type are for carrying user traffic and the messages of the second type are for carrying management messages, the messages of the second type being independent of the messages of the first type and the messages of the second type being independently transmitted of the messages of the first type;

generating, in response to a detection of congestion, at an interface between the ATM network and the frame relay network, a congestion-indicating management message of the second type; and sending the congestion-indicating management message to the frame relay network;

wherein information on connections from which congestion has been detected within a predetermined time is collected to be transmitted in a single congestion-indicating management message of the second type.

2. A method according to claim 1, wherein the congestion-indicating management message of the second type is generated based only on receiving ATM cells, having a congestion notification, belonging to a certain connection.

3. A method according to claim 1, wherein the generating of the congestion-indicating management message occurs after a predetermined number of ATM cells on the connection indicate congestion, the predetermined number being greater than one.

4. A method according to claim 3, wherein the certain number of ATM cells indicating congestion are successive ATM cells.

5. A method according to claim 1, further comprising:

generating a congestion-over message when a certain number of congestion-free ATM cells are received; and sending the congestion-over message to the frame relay network.

6. A method according to claim 5, wherein the certain number of congestion-free ATM cells are successive ATM cells.

* * * * *